United States Patent
Park et al.

(10) Patent No.: US 12,477,093 B2
(45) Date of Patent: *Nov. 18, 2025

(54) WIDE VIEWING ANGLE STEREO CAMERA APPARATUS AND DEPTH IMAGE PROCESSING METHOD USING THE SAME

(71) Applicant: ArgosVision Inc., Daejeon (KR)

(72) Inventors: Ki Yeong Park, Daejeon (KR); Dong Suk Kim, Daejeon (KR)

(73) Assignee: ArgosVision Inc., Yuseong-gu (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,900

(22) Filed: Jun. 29, 2023

(65) Prior Publication Data

US 2023/0344979 A1    Oct. 26, 2023

Related U.S. Application Data

(63) Continuation of application No. 17/405,615, filed on Aug. 18, 2021, now Pat. No. 11,729,367.

(30) Foreign Application Priority Data

| Aug. 20, 2020 | (KR) | 10-2020-0104281 |
| Feb. 22, 2021 | (KR) | 10-2021-0023552 |
| Feb. 22, 2021 | (KR) | 10-2021-0023553 |
| Jul. 26, 2021 | (KR) | 10-2021-0097826 |

(51) Int. Cl.
    *H04N 13/239*    (2018.01)
    *G06T 7/593*    (2017.01)
    (Continued)

(52) U.S. Cl.
    CPC .......... *H04N 13/271* (2018.05); *G06T 7/593* (2017.01); *G06V 20/10* (2022.01); *G06V 40/10* (2022.01); *G06V 40/20* (2022.01); *H04N 13/239* (2018.05); *H04N 23/698* (2023.01); *G06T 2207/30196* (2013.01)

(58) Field of Classification Search
    CPC ............ H04N 13/271; H04N 5/23238; H04N 13/239; H04N 13/232; H04N 2013/0081; G06T 7/593; G06T 2207/30196; G06T 2207/10021; G06T 2207/10032;
    (Continued)

(56) References Cited

U.S. PATENT DOCUMENTS

2018/0278916 A1*   9/2018   Kim ..................... G03B 37/04
2021/0334569 A1*   10/2021   Fang ................... G06V 40/171

FOREIGN PATENT DOCUMENTS

KR    10-2017-0017700      2/2017

* cited by examiner

*Primary Examiner* — Hesham K Abouzahra
(74) *Attorney, Agent, or Firm* — Heslin Rothenberg Farley & Mesiti P.C.

(57) ABSTRACT

Disclosed are a wide viewing angle stereo camera apparatus and a depth image processing method using the same. A stereo camera apparatus includes a receiver configured to receive a first image and a second image of a subject captured through a first lens and a second lens that are provided in a vertical direction; a converter configured to convert the received first image and second image using a map projection scheme; and a processing configured to extract a depth of the subject by performing stereo matching on the first image and the second image converted using the map projection scheme, in a height direction.

5 Claims, 12 Drawing Sheets

(51) Int. Cl.
    *G06V 20/10*     (2022.01)
    *G06V 40/10*     (2022.01)
    *G06V 40/20*     (2022.01)
    *H04N 13/271*     (2018.01)
    *H04N 23/698*     (2023.01)

(58) Field of Classification Search
    CPC .......... G06T 2207/30252; G06V 20/10; G06V 40/10; G06V 40/20; G06V 20/64
    See application file for complete search history.

220° fisheye lens image

Equirectangular image

WIDE VIEWING ANGLE STEREO CAMERA APPARATUS AND DEPTH IMAGE PROCESSING METHOD USING THE SAME

CROSS-REFERENCE TO RELATED APPLICATION

This is a Continuation application of pending U.S. application Ser. No. 17/405,615, filed Aug. 18, 2021, which claims the priority benefit of Korean Patent Application No. 10-2020-0104281, filed on Aug. 20, 2020, Korean Patent Application No. 10-2021-0023552, filed on Feb. 22, 2021, Korean Patent Application No. 10-2021-0023553, filed on Feb. 22, 2021 and Korean Patent Application No. 10-2021-0097826, filed on Jul. 26, 2021, in the Korean Intellectual Property Office. The entire disclosure and contents of each of these applications are hereby expressly incorporated herein by reference in their entirety.

BACKGROUND

1. Field of the Invention

The following description of example embodiments relates to a wide viewing angle stereo camera apparatus and a depth image processing method using the same, and more particularly, to a stereo camera apparatus having a wide viewing angle in which two lenses, for example, fisheye lenses are arranged in a vertical direction to improve a horizontal viewing angle and a vertical viewing angle and a depth image processing method using the same.

2. Description of the Related Art

Many researches on a red, green, blue-depth (RGB-D) camera for outputting a color image and a depth map corresponding to three-dimensional (3D) information are being conducted to implement a human-computer interface. A Kinect sensor that is an RGB-D camera Microsoft has supplied for its games provides a function of recognize body gestures of a plurality of humans and is used for various human-computer interfaces as well as games, which are its original purpose. Various RGB-D camera products are released and are expanding the use scope to 3D content creation, autonomous driving, and robots.

The RGB-D camera may be classified into a stereo camera and a time of flight (TOF) camera based on a method of obtaining depth information. A typical stereo camera includes two cameras installed as far apart as a baseline and obtains depth information based on a viewpoint mismatch between the cameras. To obtain depth information, a stereo matching process of comparing images of both cameras need to be performed. A patterned light or a structured light may be used to increase a speed and accuracy of the stereo matching process. The TOF camera refers to a camera that irradiates a laser toward a subject and calculates a distance based on an amount of time used when the irradiated light is reflected back from the subject and provides depth information with a two-dimensional (2D) image. The TOF camera provides precise distance information compared to a general stereo scheme and provides a relatively low spatial resolution and has some constraints in a measurement distance and a use environment.

General cameras use a designed lens for a rectilinear projection. In the rectilinear projection, a straight line in the real word appears as a straight line in an image and thus, an image similar to that perceived by a human may be obtained. However, as a viewing angle of the camera increases, objects present around the image are expressed relatively larger than objects present in the center of the image. In general, a rectilinear projection lens is used up to a horizontal viewing angle of about 120 degrees and a fisheye lens is used if a viewing angle of greater than 120 degrees is required. The fisheye lens may project the real world into an image as if there is Barrel distortion and may capture a viewing angle of more than 180 degrees in the image.

As the use environment of the RGB-D camera is expanding to a moving object, such as, for example, a robot, a drone, and an autonomous driving vehicle, there is an increasing demand for a wide viewing angle. However, many RGB-D cameras use the rectilinear projection lens and thus, have difficulty in providing the horizontal viewing angle of 120 degrees or more. Some stereo cameras use the fisheye lens and thus, provide a wider viewing angle. However, a fisheye lens image may not perform efficient stereo matching through a one-dimensional (1D) search as in a rectilinear projection image. Also, although the fisheye lens is used, distance information may not be obtained in the same direction as a baseline of a stereo camera. Accordingly, a horizontal angle of view is limited to be within 180 degrees.

SUMMARY

Example embodiments provide a stereo camera apparatus having a wide viewing angle in which two lenses, for example, fisheye lenses are arranged in a vertical direction to improve a horizontal viewing angle by a maximum horizontal viewing angle of the lens and to improve a vertical viewing angle up to a maximum of 180 degrees and a depth image processing method using the same.

Also, example embodiments provide a wide viewing angle stereo camera-based human-machine interface system that may recognize a motion of a whole body of a user at a close distance within 1 m using a stereo camera apparatus described herein and a depth image processing method using the same.

Also, example embodiments provide a wide viewing angle stereo camera-based first-person vision system that may recognize a motion of a user or a surrounding environment of the user using a stereo camera apparatus described herein and a depth image processing method using the same.

Also, example embodiments provide a wide viewing angle stereo camera-based human following system that may recognize and follow a human at a close distance using a stereo camera apparatus described herein and a method thereof.

According to an aspect of an example embodiment, there is provided a stereo camera apparatus including a receiver configured to receive a first image and a second image of a subject captured through a first lens and a second lens that are provided in a vertical direction; a converter configured to convert the received first image and second image using a map projection scheme; and a processing configured to extract a depth of the subject by performing stereo matching on the first image and the second image converted using the map projection scheme, in a height direction.

The converter may be configured to convert the first image and the second image using an equirectangular projection scheme.

The converter may be configured to perform rotation transformation of matching an epipolar line to a longitudinal line of a spherical surface using a spherical coordinate system.

The processing may be configured to perform stereo matching by searching for the first image and the second image converted using the map projection scheme along a vertical line corresponding to the longitudinal line.

Each of the first lens and the second lens may include a fisheye lens.

The first lens and the second lens may be fisheye lenses each with a horizontal viewing angle of 180 degrees or more.

The processing may be configured to obtain an image of the subject having a horizontal wide viewing angle of 180 degrees or more using the extracted depth of the subject.

The receiver may include an image sensor configured to capture the first image and an image sensor configured to capture the second image, and each of the image sensor configured to capture the first image and the image sensor configured to capture the second image may be provided in a width direction to obtain a wider horizontal viewing angle than a vertical viewing angle in the case of a rectangular shape of which a width length is greater than a height length.

The stereo camera apparatus may further include a vision processing configured to recognize a motion of a user and a surrounding environment that includes an object and a terrain present around the user based on a depth map of the subject extracted from the stereo camera apparatus and to provide the user with the recognized motion of the user and surrounding environment.

The stereo camera apparatus may further include a controller configured to recognize a human and a distance from the human based on a depth map of the subject extracted from the stereo camera apparatus, and to control a human following system to follow the human at a predetermined distance based on the recognized human and distance from the human.

The controller may be configured to recognize a travel direction of the human and a surrounding environment that includes an object and a terrain present around the human based on the depth map of the subject, to detect presence or absence of a collision based on the travel direction of the human and the surrounding environment, and to control the human following system to follow the human by applying a collision detection result.

According to an aspect of an example embodiment, there is provided a depth image processing method of a stereo camera apparatus, the method including receiving a first image and a second image of a subject captured through a first lens and a second lens that are provided in a vertical direction; converting the received first image and second image using a map projection scheme; and extracting a depth of the subject by performing stereo matching on the first image and the second image converted using the map projection scheme, in a height direction.

The depth image processing method may further include recognizing a motion of a user and a surrounding environment that includes an object and a terrain present around the user based on a depth map of the extracted subject and providing the user with the recognized motion of the user and surrounding environment.

The depth image processing method may further include recognizing a human and a distance from the human based on a depth map of the extracted subject, and controlling a human following system to follow the human at a predetermined distance based on the recognized human and distance from the human.

According to some example embodiments, it is possible to obtain a wide viewing angle by arranging two lenses, for example, fisheye lenses in a vertical direction and thereby improving a horizontal viewing angle and a vertical viewing angle.

According to some example embodiments, it is possible to obtain a wide viewing angle by improving a horizontal viewing angle and a vertical viewing angle, to implement a red, green, blue, depth (RGB-D) camera wider than a field of view of a human, and to easily detect an object using a wide viewing angle image converted using an equirectangular projection scheme.

In the case of a fisheye lens image, an upright subject appears tilted or bent at the periphery of the image. However, in the image converted using the equirectangular projection scheme, the upright subject is expressed in an upright state, which facilitates object detection.

Herein, provided is a wider viewing angle than that of a human such that an RGB-D camera may be mounted to a moving object such as a robot, a vehicle, and a drone and may detect a whole body of a human present within 1 m. Therefore, if it is attached to a human following robot, the whole body may be detected although a target to be followed is close. Even though the target to be followed shifts a direction of movement side to side, the target does not deviate from a field of view and a stable following is possible. Accordingly, the example embodiments may be used for a human-robot interaction and various moving objects as well as the human-computer interface.

Also, according to some example embodiments, it is possible to recognize a motion of a user or to recognize a surrounding environment of the user using a wide viewing angle stereo camera apparatus.

According to some example embodiments, although a wide viewing angle stereo camera apparatus is attached to a body portion, such as a head and a torso of a user, to capture a front direction of the user, it is possible to recognize a motion of a hand and an arm of the user and to grasp a posture and a behavior of the user due to the wide viewing angle. Also, by extracting a depth map using the wide viewing angle stereo camera apparatus, it is possible to detect or recognize a surrounding environment captured by the stereo camera apparatus, for example, a collision and a terrain such as whether a floor is flat or inclined.

When the example embodiments are applied to an apparatus, such as virtual reality (VR) and a head mounted display (HMD), it is possible to implement information about a recognized motion of a user and a surrounding environment as a virtual reality.

Also, according to some example embodiments, it is possible to recognize and follow a human at a close distance using a wide viewing angle stereo camera apparatus.

Therefore, according to some example embodiments, since a human following system, such as a moving robot, recognizes a human within a close distance, for example, within 1 m and follows the human, a professional manpower for operating a mobile robot may not be required and a manpower consumption may be reduced. That is, the example embodiments may apply various algorithms for detecting and following a captured human.

According to some example embodiments, it is possible to recognize a human within a close distance, for example, 1 m, to verify an accurate position and thereby to follow a human that quickly moves not only in a longitudinal direction but also in a latitudinal direction.

According to some example embodiments, by recognizing a human and a surrounding environment that includes an object and a terrain around the human using a depth map of a subject extracted by a stereo camera apparatus, it is possible to detect presence or absence of a collision based on the surrounding environment. When the collision is determined to occur, it is possible to control a human following system by reflecting presence of the collision and to reduce a probability of damage to a moving robot.

The present disclosure may apply to various fields including logistics fields, such as, for example, a human-following logistics robot, a postman-following robot, a personal cargo robot, and an electric golf trolley as well as a distribution field.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
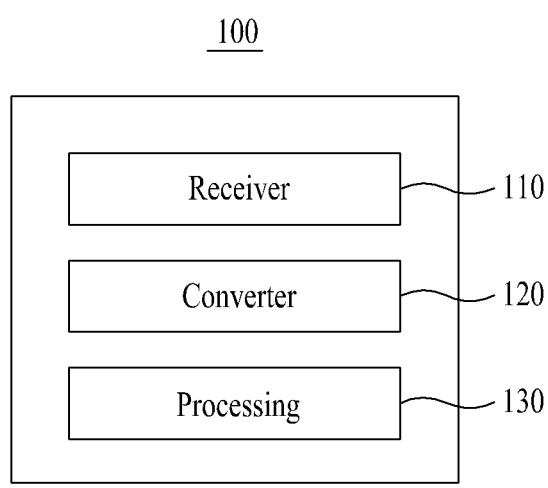
FIG. 1 illustrates a configuration of a stereo camera apparatus according to an example embodiment.

Aspects and features of the disclosure and methods to achieve the same may become clear with reference to the accompanying drawings and the following example embodiments. Example embodiments, however, may be embodied in various different forms, and should not be construed as being limited to only the illustrated embodiments. Rather, the illustrated embodiments are provided as examples so that this disclosure will be thorough and complete, and are defined by the scope of the claims.

The terms used herein are to describe the example embodiments and not to limit the disclosure. As used herein, the singular forms "a," "an," and "the," are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, and elements.

Unless otherwise defined, all terms (including technical and scientific terms) used herein have the same meaning as commonly understood by one of ordinary skill in the art to which the example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, the example embodiments will be described in more detail with reference to the accompanying drawings. Like reference numerals refer to like elements throughout and further description related thereto is omitted.

The example embodiments relate to providing a stereo camera apparatus capable of having a wide viewing angle by arranging two lenses, for example, fisheye lenses in a vertical direction to improve a horizontal viewing angle and a vertical viewing angle.

Here, the present disclosure may extract a depth of a subject captured by fisheye images and may obtain a wide viewing angle image based on the extracted depth by converting fisheye images respectively captured through the two fisheye lenses using a map projection scheme, for example, an equirectangular projection scheme in which a meridian is displayed as a straight line and by performing stereo matching on the fisheye images converted using the equirectangular projection scheme in a height direction or a vertical direction.

In the stereo camera apparatus disclosed herein, two fisheye lenses or fisheye lens cameras are vertically arranged to face the same direction. Therefore, if a spherical coordinate system is used, an epipolar line matches a longitudinal line (a meridian) of a spherical surface and if a fisheye lens image is converted using an equirectangular projection scheme, the longitudinal line is expressed as a vertical line in an image. Therefore, efficient stereo matching may be performed by conducting a search along the vertical line.

The stereo camera apparatus disclosed herein may extract or calculate a depth of a subject from an angular disparity between images converted using an equirectangular projection scheme for images captured using an upper fisheye lens and a lower fisheye lens.

Hereinafter, the example embodiments are described with reference to FIGS. 1 to 12.

Figure 2:
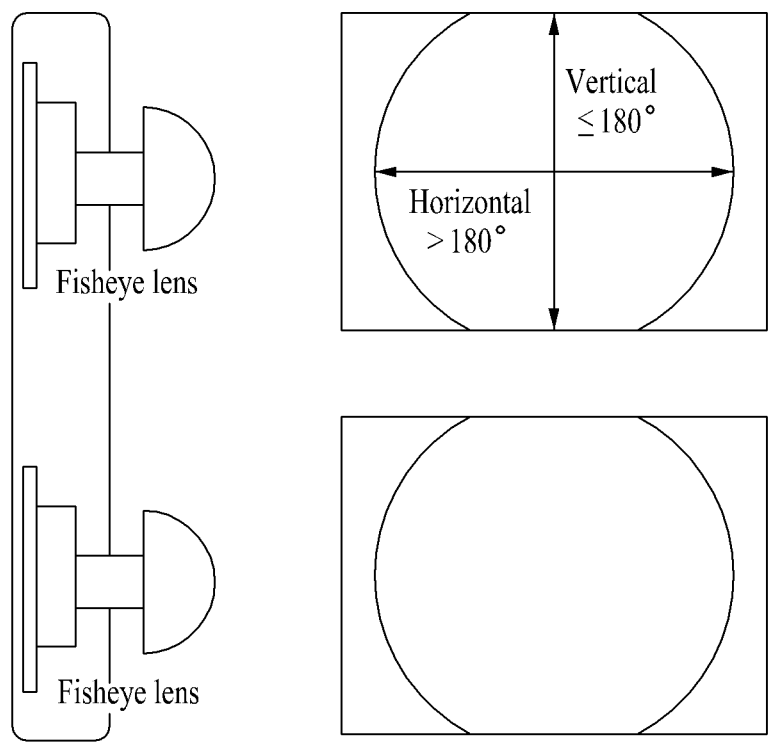
FIG. 2 illustrates an example for describing an arrangement of fisheye lenses and a width direction arrangement and a viewing angle of each of image sensors configured to obtain a horizontal viewing angle wider than a vertical viewing angle in a stereo camera apparatus of the present disclosure.
Figure 3:
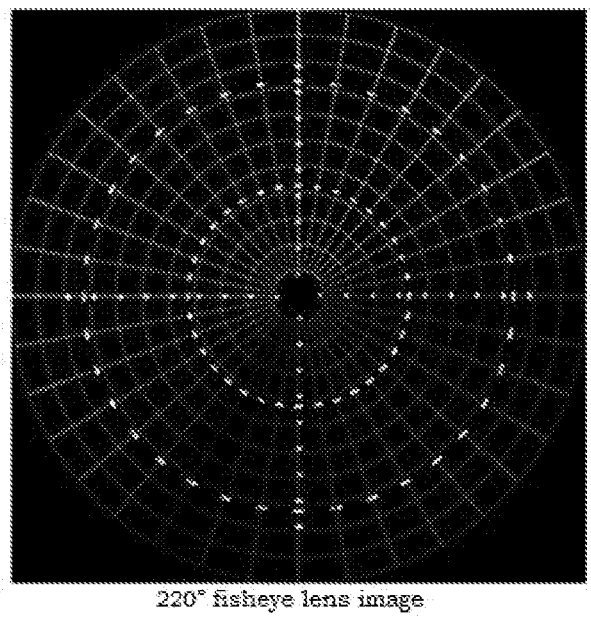
FIG. 3 illustrates an example for describing an epipolar line geometry in a stereo camera apparatus of the present disclosure.
Figure 3:
Figure 3:
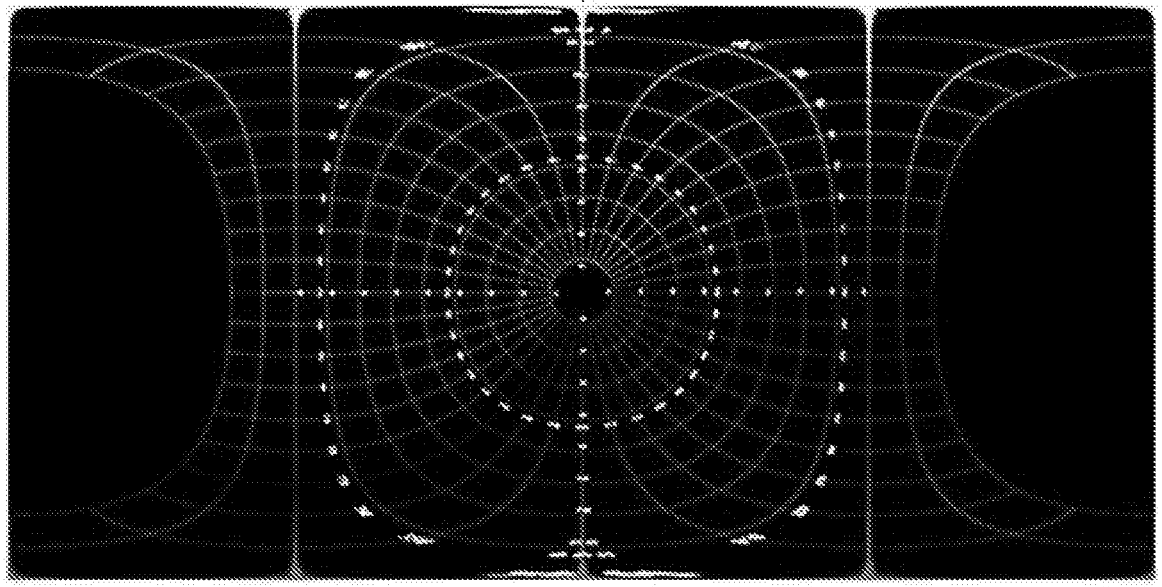
Figure 4:
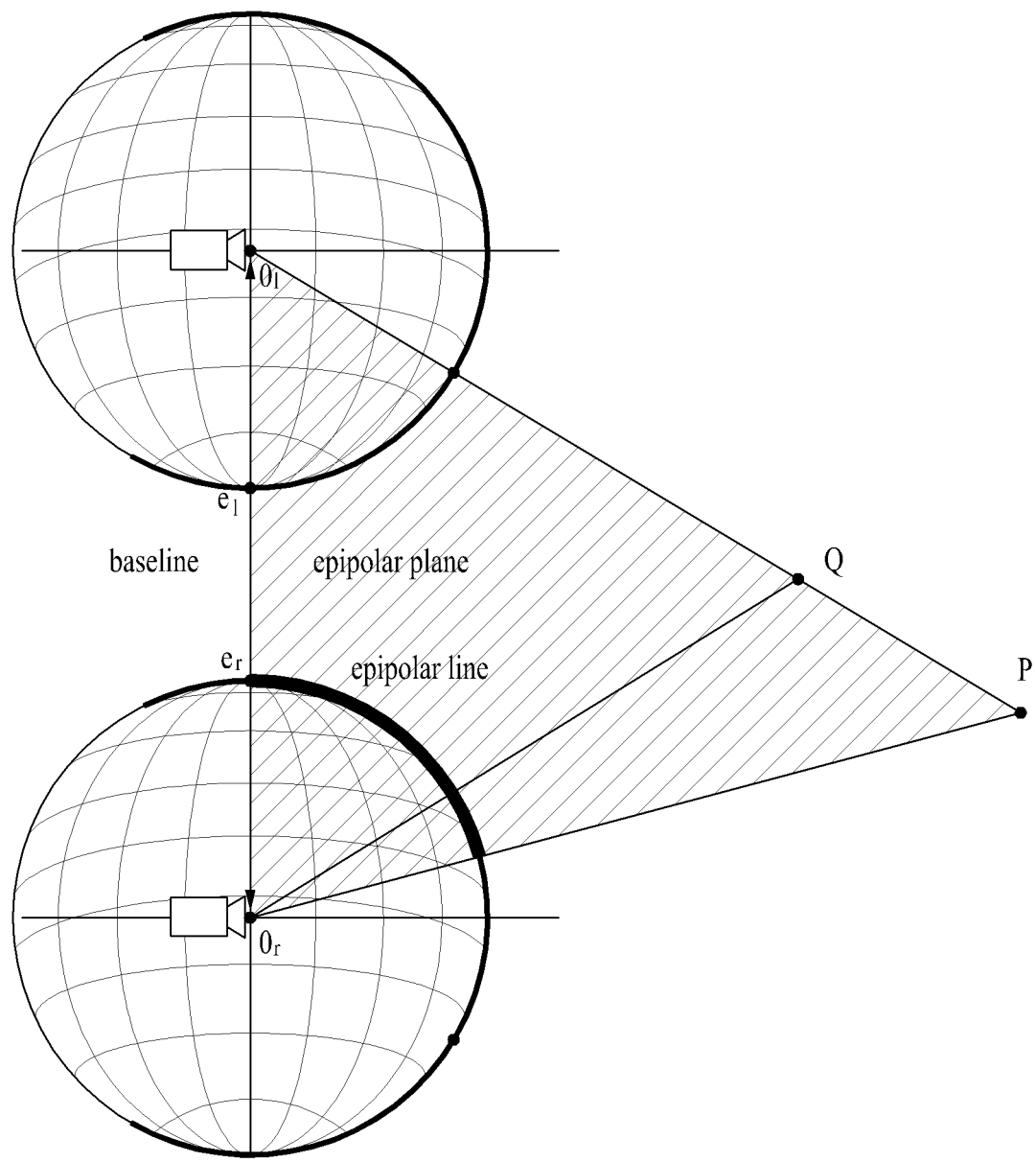
FIG. 4 illustrates an example for describing a method of extracting a depth.
Figure 5:
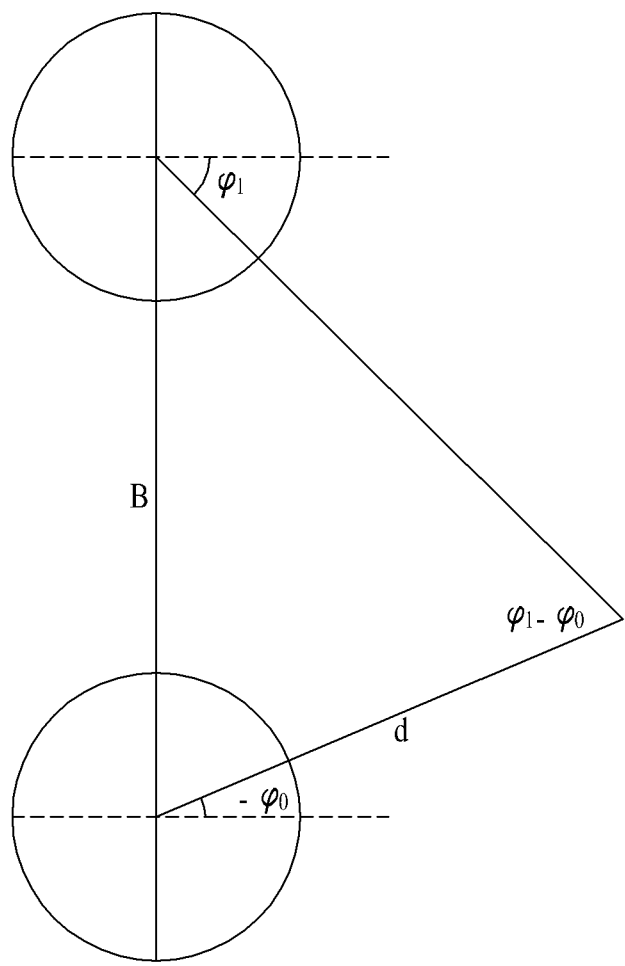
FIG. 5 illustrates an example for describing conversion of a fisheye lens image using an equirectangular projection scheme.
Figure 6:
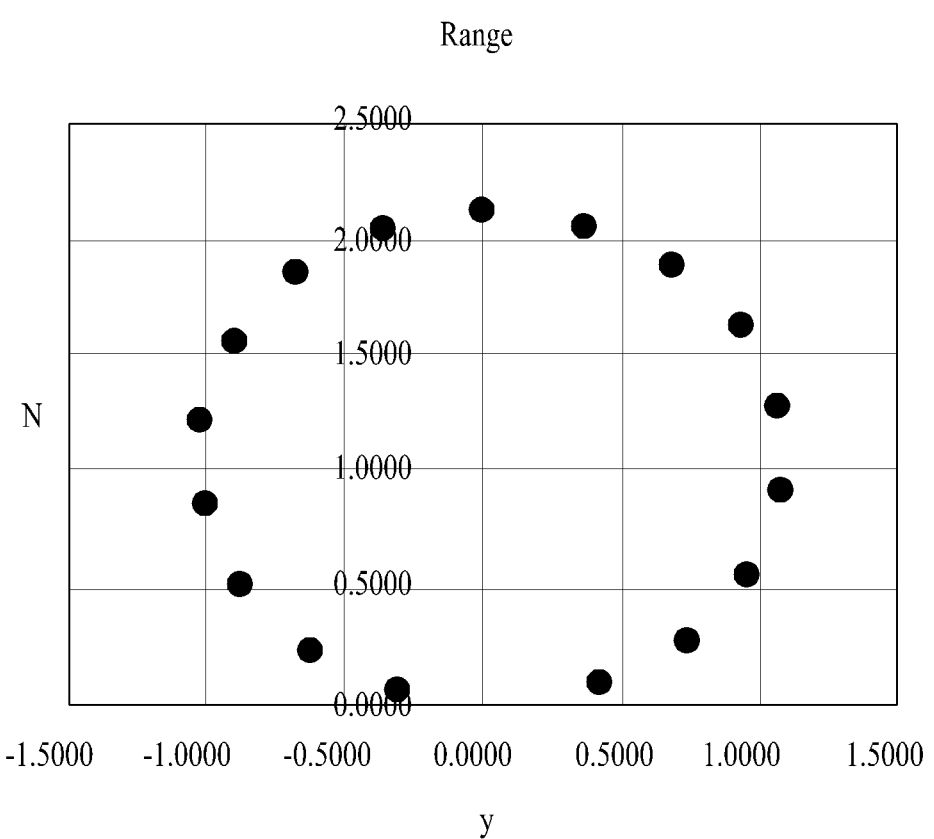
FIG. 6 illustrates an example of a depth for a disparity of the same size.
Figure 7:
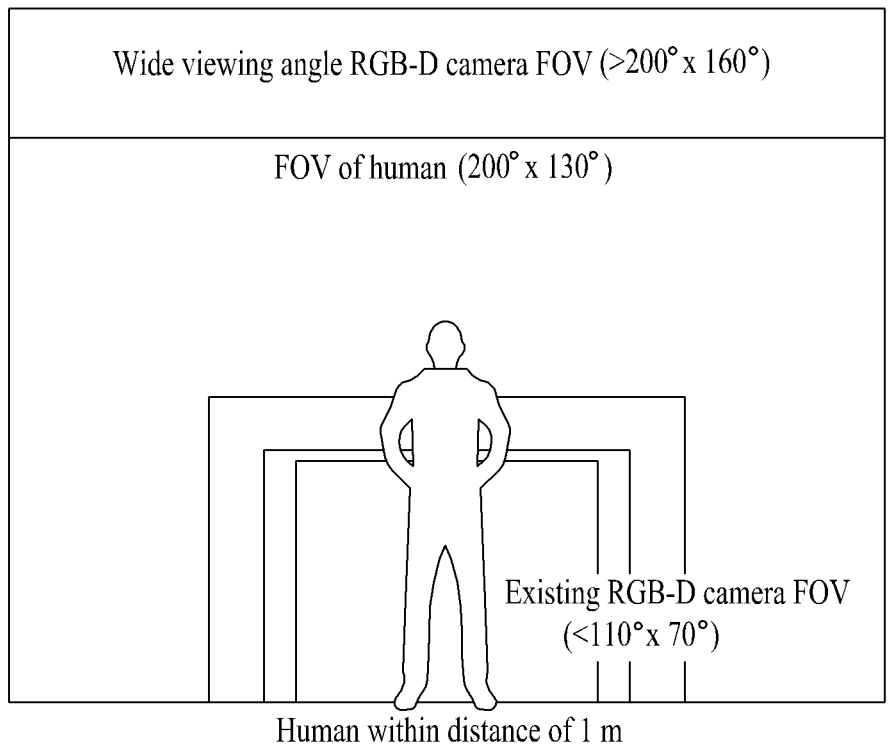
FIG. 7 illustrates an example for describing a viewing angle of a stereo camera apparatus of the present disclosure.

FIG. 1 illustrates a configuration of a stereo camera apparatus according to an example embodiment, that is, illustrates a conceptual configuration of a stereo camera apparatus or system. FIG. 2 illustrates an example for describing an arrangement of fisheye lenses and a width direction arrangement and a viewing angle of each of image sensors configured to obtain a horizontal viewing angle wider than a vertical viewing angle in a stereo camera apparatus of the present disclosure, FIG. 3 illustrates an example for describing an epipolar line geometry in a stereo camera apparatus of the present disclosure, FIG. 4 illustrates an example for describing a method of extracting a depth, FIG. 5 illustrates an example for describing conversion of a fisheye lens image using an equirectangular projection scheme, FIG. 6 illustrates an example of a depth for a disparity of the same size, and FIG. 7 illustrates an example for describing a viewing angle of a stereo camera apparatus of the present disclosure.

Referring to FIGS. 1 to 7, a stereo camera apparatus 100 according to an example embodiment includes a receiver 110, a converter 120, and a processing 130.

The receiver 110 receives a first image (or a first fisheye image) and a second image (or a second fisheye image) of a subject that are captured through a first lens, for example, a first fisheye lens (or a first fisheye lens camera), and a second lens, for example, a second fisheye lens (or a second fisheye lens camera) that are arranged in a vertical direction.

For example, referring to FIG. 2, the receiver 110 receives the first fisheye image and the second fisheye image of the subject respectively captured through the first fisheye lens and the second fisheye lens that are arranged in the vertical direction. Here, the first fisheye lens and the second fisheye lens are provided to face the same direction and may have a maximum horizontal viewing angle and a vertical viewing angle improved up to a maximum of 180 degrees. For example, the first fisheye lens and the second fisheye lens arranged in the vertical direction may have a horizontal viewing angle of 200 degrees or more and a vertical viewing angle of 180 degrees or more. However, it is provided as an example only and thus, each fisheye lens is not limited to or restricted by the horizontal viewing angle of 200 degrees or more and the vertical viewing angle of 180 degrees or more. The horizontal viewing angle and the vertical viewing angle may vary depending on a fisheye lens to be used.

Also, when each of a first image sensor of a first camera for capturing the first image and a second image sensor of a second camera for capturing the second image is in a rectangular shape of which a width length is greater than a height length, the receiver 110 may arrange the respective image sensors in a width direction to obtain a width viewing angle (or a horizontal viewing angle) wider than a height viewing angle (or a vertical viewing angle). However, without being limited thereto or restricted thereby, each of the image sensors of the receiver 110 may be arranged in the height direction.

The converter 120 converts the first fisheye image and the second fisheye image received through the receiver 110 using a map projection scheme.

Here, the converter 120 may convert the first fisheye image and the second fisheye image using an equirectangular projection scheme.

Here, the equirectangular projection scheme refers to a single map projection scheme and may represent a latitudinal line and a longitudinal line as a horizontal line and a vertical line, respectively. For example, referring to FIG. 3, the converter 120 may convert a 220-degree fisheye image to an equirectangular image using the equirectangular projection scheme. The equirectangular projection scheme may be used to capture a wide viewing angle that may not be captured in an existing rectilinear projection image, such as a 360-degree camera. When the fisheye lens image with the viewing angle of 180 degrees or more is converted using the equirectangular projection scheme, distortion may occur in which upper and lower portions of the image are greatly stretched left and right.

Also, the converter 120 may perform an image rectification for rotating the first fisheye image and the second fisheye image to be matched in a direction of a meridian prior to converting the first fisheye image and the second fisheye image using the equirectangular projection scheme. When the image rectification is performed, a comparison between the two images, that is, the first fisheye image and the second fisheye image may be simplified to a 1D search, which may lead to improving a speed of stereo matching.

The processing 130 extracts a depth or a depth map of the subject captured through the first fisheye lens and the second fisheye lens by performing stereo matching on fisheye images, that is, a first equirectangular image and a second equirectangular image converted by the converter 120 using the equirectangular projection scheme, in a height direction or a vertical direction.

Here, referring to FIG. 4, two fisheye lenses or fisheye lens cameras are vertically provided to face the same direction. Therefore, if the spherical coordinate system is used, an epipolar line matches a longitudinal line (a meridian) of a spherical surface and if a fisheye lens image is converted using the equirectangular projection scheme, the longitudinal line is expressed as a vertical line in an image. Therefore, the processing 130 may perform efficient stereo matching by conducting a search along the vertical line.

Referring to FIG. 5, for images captured through an upper fisheye lens and a lower fisheye lens, the processing 130 may extract or calculate a depth d of a subject from an angular disparity, that is, $\varphi_1 - \varphi_0$, between images converted using the equirectangular projection scheme. The depth d may be extracted or calculated according to the following Equation 1.

$$d = \frac{B \cdot \cos\varphi_1}{\sin(\varphi_1 - \varphi_0)} \quad \text{[Equation 1]}$$

Here, although an angular disparity is the same, it can be known that the depth d varies according to $\varphi_1$. Also, it can be known that the depth d is not obtained in up and down corresponding to the same direction as a baseline B, for example, when $\varphi_1 = -90$ degrees or 90 degrees.

Here, referring to FIG. 6, when a direction in which a camera faces is a Z axis and a direction of a baseline is a Y axis, a depth of an angular disparity with the same size may vary.

In existing stereo with a limited viewing angle, calculation is performed through approximation based on an aspect that a depth (or a distance) and a size of disparity are in inverse proportion. However, when using a wide viewing angle, the depth and the angular disparity have a complex relationship as in Equation 1, which needs to be considered.

Also, the processing 130 may obtain an image of the subject having a wide viewing angle that includes a horizontal viewing angle of 180 degrees or more and a vertical viewing angle of maximum 180 degrees using the extracted depth of the subject.

As described above, a stereo camera apparatus according to an example embodiment may obtain a wide viewing angle by arranging two lenses, for example, fisheye lenses in a vertical direction and thereby improving a horizontal viewing angle and a vertical viewing angle. For example, the present disclosure may implement a wide viewing angle RGB-D camera apparatus in which the vertical viewing angle is a maximum of 180 degrees and a horizontal viewing angle is much larger than 180 degrees. Here, in the case of using a 280-degree fisheye lens, a viewing angle having a horizontal viewing angle of 280 degrees and a vertical viewing angle of 180 degrees may be implemented.

Also, a stereo camera apparatus according to an example embodiment, it is possible to obtain a wide viewing angle by improving a horizontal viewing angle and a vertical viewing angle, to implement an RGB-D camera wider than a viewing angle of a human, and to easily detect an object accordingly. For example, referring to FIG. 7, a stereo camera apparatus according to an example embodiment may easily detect a close object and thus, may detect a whole body of a human close within 1 m.

Also, when a stereo camera apparatus according to an example embodiment is attached to a following robot, the stereo camera apparatus may detect a whole body although a target to be followed is close. Although the target to be followed changes a travel direction left and right, the target to be followed does not deviate from a field of view and thus stable following is possible. Therefore, the present disclosure may be employed not only for a human-computer interface but also for a human-robot interaction and various moving objects.

As described above, the stereo camera apparatus disclosed herein may perform efficient stereo matching between an upper image and a lower image by converting images captured by arranging two fisheye lenses or fisheye lens cameras in a vertical direction or a height direction, using an equirectangular projection scheme.

In the case of an existing stereo camera using a rectilinear projection image, there is no big difference in arranging two cameras horizontally or vertically. Therefore, the existing stereo camera may arrange the cameras in a convenient direction for mounting into consideration of a direction of a subject. However, in the case of a wide viewing angle stereo camera using an image converted using the equirectangular projection scheme, a shape of an image distortion may vary according to an installation direction of the camera. Referring to FIG. 6, since an accuracy of a depth obtainable through stereo matching varies, an arrangement of the stereo camera capable of obtaining an image distortion and a further accurate depth value for the subject needs to be considered.

In the case of a rectilinear projection image, a straight line in the real world is expressed as a straight line in the image at all times and thus, a distortion does not occur in the image due to the installation direction of the camera. However, in the case of the image converted using the equirectangular projection scheme, a vertical line in the real world is expressed as a straight line, whereas a horizontal line in the real world is expressed as a curved line and a shape of a distortion in the image varies according to the installation direction of the camera.

That is, only when the camera is not tilted left and right, upright subjects may be expressed with the least distortion in the image converted using the equirectangular projection scheme.

Therefore, the camera using the image converted through the equirectangular projection scheme may be assumed to be used in a state in which the camera generally faces the front. The wide viewing angle stereo camera in which two lenses are arranged in a height direction may use advantages found in arrangement in the height direction into consideration of the following three aspects.

First, in stereo with a viewing angle of 180 degrees or more, occlusion occurs between two cameras. For example, a side camera that constitutes the stereo camera is visible in an image. Therefore, two cameras may be arranged in a vertical direction such that a direction of the occlusion may be upward and downward. In a general situation, meaningful subjects are highly likely to be present in the front or in a side direction rather than in a ceiling direction or a floor direction. Therefore, that the direction of the occlusion is upward and downward may be advantageous.

Second, in the case of using an equirectangular projection scheme, an image is expressed in an excessively enlarged manner with getting closer to an upper end and a lower end of the image corresponding to a pole. By arranging two cameras in the vertical direction, a direction in which such distortion occurs may be matched to an upward direction and a downward direction.

Third, in the existing stereo with a limited viewing angle, calculation is performed through approximation based on aspect that a size of depth and a disparity are in an inverse proportion. However, if the viewing angle increases, the depth decreases from a direction the camera faces to a baseline direction of the stereo camera even for the disparity of the same size. Therefore, it is difficult to obtain an accurate depth. When the two cameras are arranged in the vertical direction, the baseline is directed upward and downward. Therefore, an area with a degraded accuracy may be matched upward and downward.

The stereo camera apparatus of the present disclosure may minimize an area in which a depth is unobtainable by matching a direction in which interference between two cameras or two lenses occurs and a direction in which the depth is unobtainable and may increase a horizontal viewing angle of a depth map by 180 degrees or more. The stereo camera apparatus of the present disclosure may obtain a 280-degree depth map in a horizontal direction in the case of using a 280-degree fisheye lens.

Also, if a stereo camera apparatus according to an example embodiment performs stereo matching by searching for an upper camera image based on an image of a lower camera between an upper camera and the lower camera, a hole by occlusion is generated in a downward direction of an object. In the stereo camera apparatus that is arranged in the horizontal direction, the hole is generated on the left or the right of the object. Compared thereto, the present disclosure may be more advantageous for an objection detection since the hole is generated downward of the object if the hole is generated.

Figure 8:
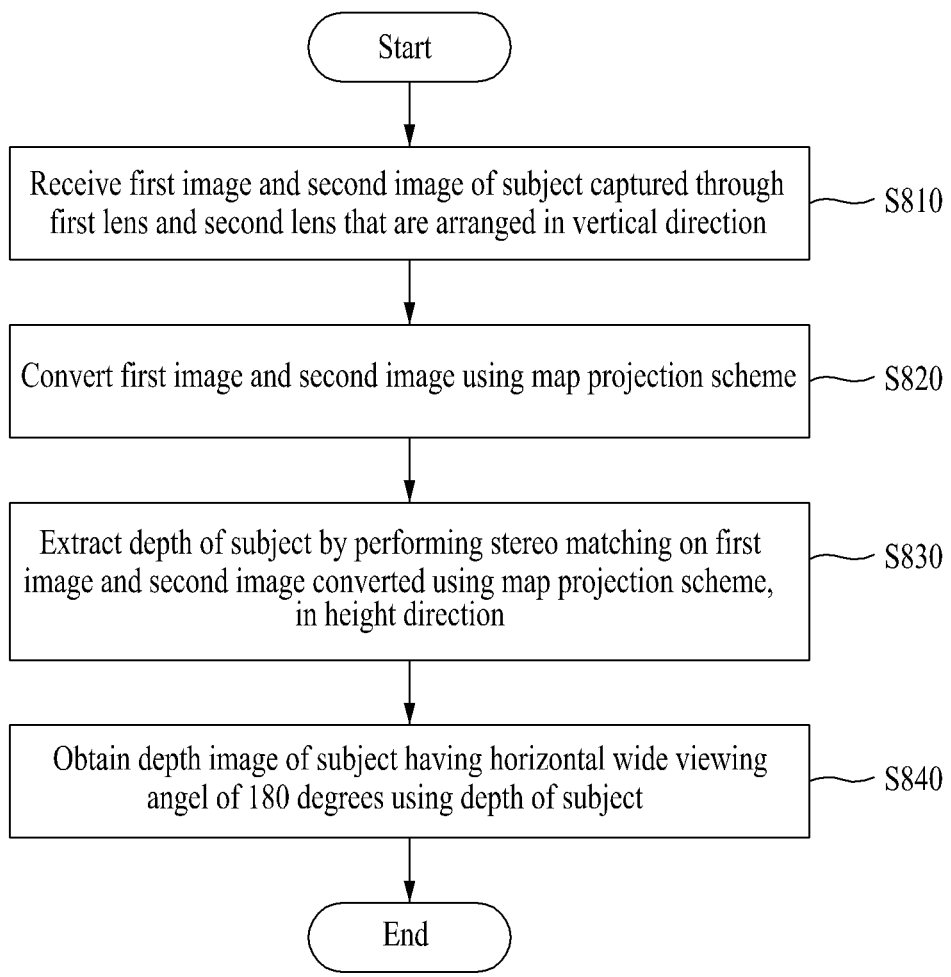
FIG. 8 is a flowchart illustrating a depth image processing method of a stereo camera apparatus according to an example embodiment.

FIG. 8 is a flowchart illustrating a depth image processing method of a stereo camera apparatus according to an example embodiment, and also illustrates a flowchart in the stereo camera apparatus of FIGS. 1 to 7.

Referring to FIG. 8, in operation S810, the depth image processing method of the stereo camera apparatus receives a first image, for example, a first fisheye image, and a second image, for example, a second fisheye image, of a subject captured through a first lens and a second lens that are arranged in a vertical direction.

When the first fisheye image and the second fisheye image are received in operation S810, the received first fisheye image and second fisheye image are converted using a map projection scheme in operation S820.

Here, in operation S820, the first fisheye image and the second fisheye image may be converted using an equirectangular projection scheme. Also, in operation S820, transformation may be performed to match an epipolar to a longitudinal line of a spherical surface using a spherical coordinate system.

When the first fisheye image and the second fisheye image are converted using the map projection scheme in operation S820, a depth of the subject is extracted by performing stereo matching on the first fisheye image and the second fisheye image converted using the map projection scheme, in a height direction in operation S830. In operation S840, a depth image of the subject having a wide viewing angle in which a horizontal viewing angle is 180 degrees or more and a vertical viewing angle is a maximum of 180 degrees is obtained using the extracted depth of the subject.

Here, in operation S830, stereo matching may be performed by searching for the first image and the second image converted using the map projection scheme along a vertical line corresponding to the longitudinal line.

Although the method of FIG. 8 is described, it is apparent to those skilled in the art that the aforementioned description made above with reference to FIGS. 1 to 7 may apply to each of operations of FIG. 8.

Also, the stereo camera apparatus may recognize arm and hand motions of a user being captured, a posture of the user, and a surrounding environment, for example, a surrounding terrain and a surrounding object, and may provide such information.

Figure 9:
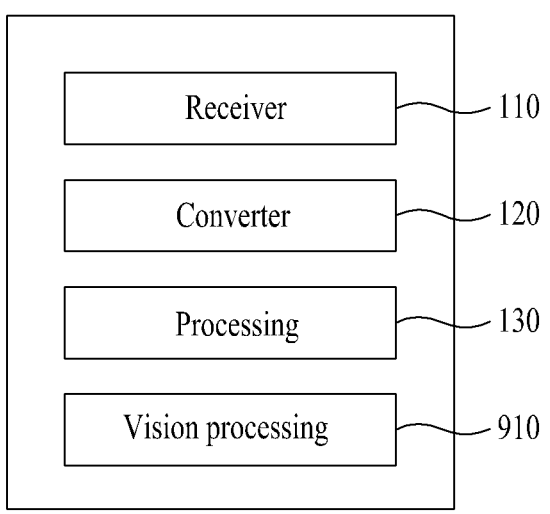
FIG. 9 illustrates a configuration of a first-person vision system based on a stereo camera apparatus according to an example embodiment.
Figure 10:
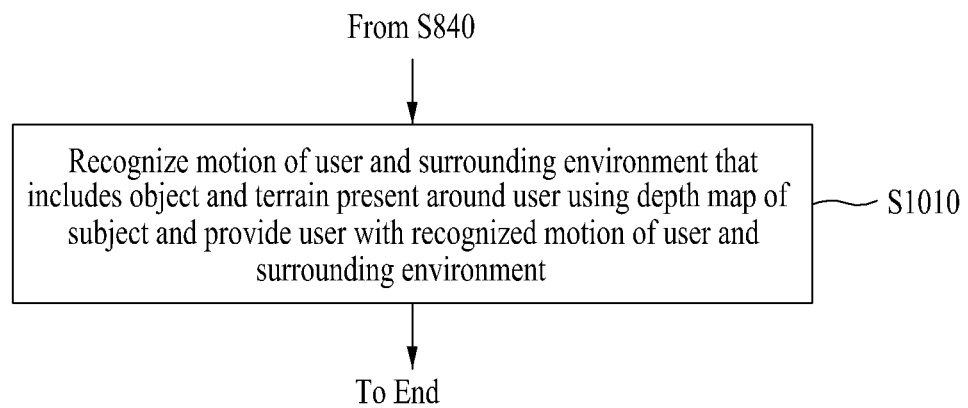
FIG. 10 is a flowchart illustrating an additional operation of a depth image processing method when a stereo camera apparatus according to an example embodiment operates as a first-person vision system.

Further description related to the disclosure is made with reference to FIGS. 9 and 10.

FIG. 9 illustrates a configuration of a first-person vision system based on a stereo camera apparatus according to an example embodiment.

Referring to FIG. 9, the stereo camera apparatus 100 may operate as a first-person vision system by further including a vision processing 910.

In this case, the stereo camera apparatus 100 may be attached to a body portion, such as a head and a torso of the user, further a cap and the like, and may capture a front direction of the user. Since the stereo camera apparatus 100 has a wide viewing angle, the stereo camera apparatus 100 may capture a body portion, such as an arm and a hand of the user, and may also capture a surrounding environment, such as, for example, an object, a building, and a terrain, although the front of the user is captured. Herein, anything captured in the above manner is described as a subject.

When the stereo camera apparatus 100 operates as the first-person vision system, the vision processing 910 recognizes a motion of the user and a surrounding environment that includes an object and a terrain present around the user using the depth map of the subject obtained by the stereo camera apparatus 100 and provides the user with the recognized information, that is, information about the motion of the user and the surrounding environment.

The first-person vision system, that is, the stereo camera apparatus 100 may provide a field of view similar to that of a human through, for example, an RGB-D camera apparatus having a wide viewing angle of horizontally 180 degrees or more. Therefore, a hand motion of the user wearing the first-person vision system, that is, the stereo camera apparatus 100 may enter the field of the view in all directions. Accordingly, although the stereo camera apparatus 100 captures the front of the user, the vision processing 910 may recognize hand and arm motions of the user and a behavior and a posture of the user.

Since a depth map is extracted by the stereo camera apparatus 100, the vision processing 910 may detect a collision probability of the user by detecting a surrounding object and may provide the user with information about the detected collision probability. When the user is holding an object with a hand of the user, the vision processing 910 may provide information, such as that the hand of the user is present behind the object or that the object is present within the hand of the user, and may also provide information about the surrounding terrain and object through recognition of the surrounding environment in real time.

The stereo camera apparatus 100 may detect hand and arm motions of the user or a close object by further including the vision processing 910.

FIG. 10 is a flowchart illustrating an additional operation of a depth image processing method when a stereo camera apparatus according to an example embodiment operates as a first-person vision system, and illustrates an operation additionally performed by the stereo camera apparatus that operates as the first-person vision system of FIG. 9 after operation S840 of the depth image processing method of FIG. 8.

Referring to FIG. 10, in operation S1010, after the depth and or the depth map of the subject is extracted through operations S830 and S840 of FIG. 8, the stereo camera apparatus recognizes a motion of the user and a surrounding environment that includes an object and a terrain present around the user using the extracted depth map of the subject and provides the user with the recognized motion and surrounding environment of the user.

Also, the stereo camera apparatus may recognize a human and a surrounding environment that includes an object and a terrain present around the human using the depth map of the subject extracted by the stereo camera apparatus and may detect presence or absence of a collision based on the recognized surrounding environment. When the collision is determined to occur, the stereo camera apparatus may control a human following system by reflecting the collision.

Figure 11:
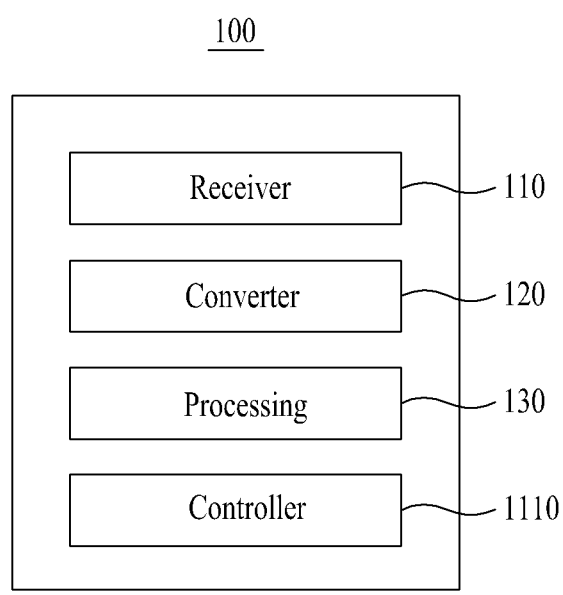
FIG. 11 illustrates a configuration of a human following system based on a stereo camera apparatus according to an example embodiment.
Figure 12:
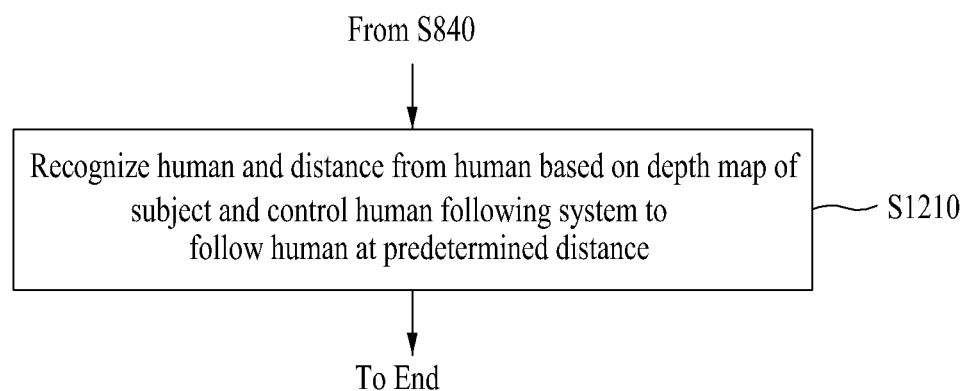
FIG. 12 is a flowchart illustrating an additional operation of a depth image processing method performed when a stereo camera apparatus according to an example embodiment operates as a human following system.

Further description related to the disclosure is made with reference to FIGS. 11 and 12.

FIG. 11 illustrates a configuration of a human following system based on a stereo camera apparatus according to an example embodiment.

Referring to FIG. 11, the stereo camera apparatus 100 may operate as the human following system by further including a controller 1110.

In this case, since the stereo camera apparatus 100 has a wide viewing angle, the stereo camera apparatus 100 may capture a human to be followed by the human following system and a surrounding environment, for example, an object, a building and a terrain. Herein, anything captured in the above manner is described as a subject.

When the stereo camera apparatus 100 operates as the human following system, the controller 1110 may recognize a human to be followed and a distance from the human based on a depth map of the subject obtained by the stereo camera apparatus 100 and may control the human following system, for example, the stereo camera apparatus 100 to follow the human at a predetermined distance based on the recognized human and distance from the human.

Here, the controller 1110 may recognize a travel direction of the human and the surrounding environment that includes an object present around the human, a collidable object, and a terrain as well as the human and the distance from the human using the depth map of the subject, may detect presence or absence of a collision of the human following system, that is, the stereo camera apparatus 100, based on the recognized information, that is, the travel direction of the human and the surrounding environment, and may control the human following system, that is, the stereo camera apparatus 100 to follow the human by applying a collision detection result.

The human following system, that is, the stereo camera apparatus 100 may provide a field of view similar to that of the human through the stereo camera apparatus 100, for example, an RGB-D camera apparatus having a wide viewing angle in which a horizontal viewing angle is much greater than 180 degrees and thus, may follow the human at a close distance, for example, within 1 m and may recognize a whole body of the human at a close distance. Therefore, the human following system, that is, the stereo camera apparatus 100 may verify an accurate position and may follow the human that quickly moves not only in a longitudinal direction but also in a traverse direction alone.

FIG. 12 is a flowchart illustrating an additional operation of a depth image processing method performed when a stereo camera apparatus according to an example embodiment operates as a human following system, and illustrates an operation additionally performed by the stereo camera apparatus that operates as the human following system of FIG. 11 after operation S840 of the depth image processing method of FIG. 8.

Referring to FIG. 12, in operation S1210, after the depth or the depth map of the subject is extracted through operations S830 and S840 of FIG. 8, a controller included in the stereo camera apparatus recognizes a human and a distance from the human based on the extracted depth map of the subject and controls the human following system to follow the human at a predetermined distance based on the recognized human and distance from the human.

Here, in operation S1210, the controller may recognize a travel direction of the human and a surrounding environment that includes an object and a terrain around the human based on the depth map of the subject, may detect presence or absence of a collision based on the travel direction of the human and the surrounding environment, and may control the human following system to follow the human by applying a collision detection result.

The apparatuses described herein may be implemented using hardware components, software components, and/or a combination thereof. For example, the systems, the apparatuses, and the components described herein may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be permanently or temporally embodied in any type of machine, component, physical equipment, virtual equipment, computer storage medium or device, or a signal wave to be transmitted, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. The media may also include, alone or in combination with the program instructions, data files, data structures, and the like. The program instructions recorded in the media may be specially designed and configured for the example embodiments or may be known to those skilled in the computer software art and thereby available. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of program instructions include both machine code, such as produced by a compiler, and files containing higher level code that may be executed by the computer using an interpreter. The hardware device may be configured to operate as one or more software modules to perform the operation of the example embodiments or vice versa.

While the example embodiments are described with reference to specific example embodiments and drawings, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A stereo camera apparatus comprising:
   a receiver configured to receive a first image and a second image of a subject captured through a first lens and a second lens that are provided in a vertical direction;
   a converter configured to convert the received first image and second image using an equirectangular projection scheme; and
   a processing configured to extract a depth of the subject by performing stereo matching on the first image and the second image converted using the equirectangular projection scheme, in a height direction,
   wherein the converter is configured to use the equirectangular projection scheme based on a spherical coordinate system, as the first lens and the second lens are provided in the vertical direction so that an epipolar line matches a longitudinal line of a spherical surface.

2. The stereo camera apparatus of claim 1, wherein the converter is configured to perform rotation transformation of matching the epipolar line to the longitudinal line of the spherical surface using the spherical coordinate system.

3. The stereo camera apparatus of claim 1, wherein the first lens and the second lens are fisheye lenses each with a horizontal viewing angle of 180 degrees or more.

4. The stereo camera apparatus of claim 1, wherein the processing is configured to obtain an image of the subject having a horizontal wide viewing angle of 180 degrees or more using the extracted depth of the subject.

5. A depth image processing method of a stereo camera apparatus, the depth image processing method comprising:
- receiving a first image and a second image of a subject captured through a first lens and a second lens that are provided in a vertical direction;
- converting the received first image and second image using an equirectangular projection scheme; and
- extracting a depth of the subject by performing stereo matching on the first image and the second image converted using the equirectangular projection scheme, in a height direction,
- wherein the converting includes using the equirectangular projection scheme based on a spherical coordinate system, as the first lens and the second lens are provided in the vertical direction so that an epipolar line matches a longitudinal line of a spherical surface.

\* \* \* \* \*